(12) United States Patent
Pfaffmann et al.

(10) Patent No.: US 11,616,355 B2
(45) Date of Patent: Mar. 28, 2023

(54) TENSIONING DEVICE FOR A WIRED ENERGY AND/OR DATA TRANSMISSION PATH

(71) Applicant: DEERE & COMPANY, Moline, IL (US)

(72) Inventors: Simon Pfaffmann, Mannheim (DE); Volker Kegel, Mannheim (DE); Nicolai Tarasinski, Frankenthal (DE); Felipe De Moraes Boos, Kaiserslautern (DE); Julian Daubermann, Stuttgart (DE)

(73) Assignee: DEERE & COMPANY, Moline, IL (US)

( * ) Notice: Subject to any disclaimer, the term of this patent is extended or adjusted under 35 U.S.C. 154(b) by 549 days.

(21) Appl. No.: 16/784,001

(22) Filed: Feb. 6, 2020

(65) Prior Publication Data

US 2020/0280181 A1 Sep. 3, 2020

(30) Foreign Application Priority Data

Mar. 1, 2019 (DE) .......................... 102019202826.8

(51) Int. Cl.
*H02G 11/02* (2006.01)
*B60L 9/00* (2019.01)
*H02G 3/04* (2006.01)
*H02G 11/00* (2006.01)
*H04B 3/02* (2006.01)

(52) U.S. Cl.
CPC ............... *H02G 11/02* (2013.01); *B60L 9/00* (2013.01); *H02G 3/0456* (2013.01); *H02G 11/003* (2013.01); *H04B 3/02* (2013.01)

(58) Field of Classification Search
CPC .... H02G 11/02; H02G 11/003; H02G 3/0456; H02G 11/00; B60L 9/00; H04B 3/02; B65H 59/38; B65H 59/04; B65H 59/36; B65H 59/387; B65H 75/425; B65H 75/442; B65H 75/42
USPC ..... 174/68.1, 68.3, 75 F; 340/538, 533, 500; 307/9.1
See application file for complete search history.

(56) References Cited

U.S. PATENT DOCUMENTS

| 3,943,306 | A | * | 3/1976 | Aihara | H02G 11/02 |
| | | | | | 242/390.8 |
| 4,163,526 | A | * | 8/1979 | Williams | H02G 11/02 |
| | | | | | 242/390 |
| 4,379,615 | A | * | 4/1983 | Toda | H02G 11/02 |
| | | | | | 242/388.6 |

(Continued)

FOREIGN PATENT DOCUMENTS

| CN | 208326908 U | 1/2019 |
| DE | 102017215822 A1 | 3/2019 |

(Continued)

OTHER PUBLICATIONS

European Search Report issued in counterpart application No. 20159728.3 dated Jul. 24, 2020 (17 pages).

*Primary Examiner* — Angel R Estrada

(57) ABSTRACT

A tensioning device for a wired energy or data transmission path includes a winding drum, a cable guide wire stored on the winding drum, and a spring accumulator. The winding drum is rotatable by an electrical drive for winding and unwinding the cable guide wire. The spring accumulator is operably exerting a resilient tensile force on a wire portion unreeled from the winding drum.

18 Claims, 4 Drawing Sheets

(56) References Cited

U.S. PATENT DOCUMENTS

| | | | | |
|---|---|---|---|---|
| 4,557,038 A | * | 12/1985 | Wcislo | H02K 15/066 |
| | | | | 174/DIG. 20 |
| 6,065,710 A | * | 5/2000 | Richter | H02G 11/02 |
| | | | | 242/388.6 |
| 10,938,196 B2 | * | 3/2021 | Kegel | H02G 11/02 |

FOREIGN PATENT DOCUMENTS

| | | |
|---|---|---|
| DE | 102017217481 A1 | 4/2019 |
| EP | 2868609 A1 | 5/2015 |

* cited by examiner

TENSIONING DEVICE FOR A WIRED ENERGY AND/OR DATA TRANSMISSION PATH

RELATED APPLICATIONS

This application claims priority to German Patent Application Ser. No. 102019202826.8, filed Mar. 1, 2019, the disclosure of which is hereby incorporated by reference in its entirety.

FIELD OF THE DISCLOSURE

The present disclosure relates to a tensioning device for a wired energy or data transmission path, having a cable guide wire stored on a winding drum, wherein the winding drum can be set in rotation by means of an associated electrical drive for winding and unwinding the cable guide wire.

BACKGROUND

An energy or data transmission path in association with a power supply system for a vehicle fleet is known, for example, from DE 10 2017 217 481 A1. The power supply system comprises a first base station associated with a first fleet vehicle and a second base station associated with a second fleet vehicle, wherein a cable guide wire, which is variable in length, is tensioned between the two base stations in a self-supporting manner, on which cable guide wire a power or data transmission cable is guided in loops, each of a fixed length, by displaceable holding elements. The first base station comprises a winding drum for varying the length of the cable guide wire, which winding drum has a drum body for receiving the cable guide wire, wherein the drum body can be set in rotation by controlling an electromotive drive for reeling and unreeling the cable guide wire. The electrical drive is typically formed as an electric geared motor. A device for torque control, which cooperates with the electric geared motor, enables a predetermined wire tension to be maintained so that excessive sagging of the cable guide wire between the fleet vehicles can be prevented.

Owing to the mass-induced inertia of the drum body of the winding drum, the active torque control provided for maintaining the predetermined wire tension is unable to react to sudden changes in the distance between the base stations. In such a case, undesired load peaks can occur within the cable guide wire.

Thus, there is a need to form a structurally simplified tensioning device of the type mentioned at the outset in such a way that it is able to reliably absorb temporary load peaks within the cable guide wire.

SUMMARY

In the present disclosure, a tensioning device for a wired energy or data transmission path comprises a cable guide wire stored on a winding drum, wherein the winding drum can be set in rotation by an associated electrical drive for winding and unwinding the cable guide wire. According to the present disclosure, a spring accumulator is provided by which a resilient tensile force can be exerted on a wire portion unreeled from the winding drum. The reaction behavior, which is improved in comparison to the inertially loaded reeling and unreeling of the cable guide wire, enables temporary load peaks within the cable guide wire to be reliably absorbed or damped. Possible damage to the cable guide wire and supporting structures associated therewith can therefore be prevented. The spring accumulator itself can be formed as a passive spring (damper) unit, which can be realized with relatively little technical effort.

The energy or data transmission path can, in particular, be part of a power supply system for a vehicle fleet, as described in DE 10 2017 217 481 A1. Accordingly, a first fleet vehicle is provided with a first base station and a second fleet vehicle is provided with a second base station. The cable guide wire, more precisely a wire portion unreeled from the winding drum, is tensioned between the two base stations in a self-supporting manner, on which cable guide wire a power or data transmission cable is in turn guided in loops, each of a fixed length, by displaceable holding elements. In this case, one of the two base stations supports the winding drum, while a free end of the unreeled wire portion as well as the power or data transmission cable is releasably connected to the other of the two base stations via an associated mechanical or electromechanical coupling device.

The fleet vehicles are, for example, electrically operated agricultural or construction machines, which move in a predetermined formation along a field or ground surface to be worked.

The electrical drive sets the winding drum in rotation via a two-part drive shaft having a first and second shaft portion, wherein a torsion spring connecting the two shaft portions is provided as the spring accumulator. By selecting the spring characteristics of the torsion spring accordingly, the spring or damping behavior of the spring accumulator can be predetermined as desired. The spring accumulator is notable for its particular robustness and long useful life owing to its low number of moving parts.

The torsion spring can be formed in the design of a leg spring having a first and second leg, wherein the first leg is pivotably associated with the first shaft portion and the second leg is pivotably associated with the second shaft portion. In this case, the two mutually flush shaft portions extend within the leg spring, which results in a particularly compact design of the spring accumulator.

A sensor can furthermore be present for detecting a relative angle occurring between the two shaft portions. The sensor can have a first angle encoder associated with the first shaft portion and a second angle encoder associated with the second shaft portion. The signals generated by the angle encoders are relayed to a control unit for evaluation. In association with the presumably known spring characteristics of the torsion spring, the control unit is able to draw a direct conclusion relating to the tensile force acting in the unreeled wire portion based on the mutual misalignment of the two shaft portions which can be derived from the relayed signals.

According to an alternative embodiment, the spring accumulator has a guide roller pair and a deflection roller for deflecting the wire portion unreeled from the winding drum along a variable deflection path, wherein a spring cylinder pre-tensioning the deflection roller in the direction of an increase in the deflection path is provided. The spring cylinder comprises a cylinder housing and a spring piston longitudinally displaceably guided therein, wherein the cylinder housing and spring piston are coupled to one another via a spring element. The use of a spring cylinder is recommended in particular in the case of a relatively heavy power or data transmission cable or longer distances to be bridged, since the maximum permissible tensile loads in a corresponding design are generally higher than when a torsion spring is used.

In the simplest case, the spring cylinder applies the resilient tensile force by a helical spring. Depending on the design of the spring cylinder, this can be a tension or a pressure spring. By selecting the spring characteristics of the helical spring accordingly, the spring or damping behavior of the spring cylinder can be adapted to the respective requirements.

A possible variant of the tensioning device provides that the spring cylinder is hydraulically formed, wherein the resilient tensile force is applied by a bladder accumulator which communicates with the spring cylinder and whereof the properties determine the spring characteristics of the spring accumulator. The spring cylinder is, in particular, formed to be single-acting and has a working chamber which is formed within a hydraulic cylinder with a hydraulic piston, is loaded on the pressure side by the weight of the cable guide wire and is in communication with the bladder accumulator via a supply line. In the case of a double-acting spring cylinder with two working chambers, it is moreover conceivable to provide an orifice between the two working chambers, which enables targeted damping of vibrations which occur in the unreeled wire portion. In such a case, each of the two working chambers can be connected to a separate bladder accumulator.

In order to be able to adjust the spring characteristics of the spring accumulator, it is possible for a hydraulic operating pressure of the bladder accumulator to be modified by a control valve arrangement communicating with a hydraulic system.

Furthermore, a sensor can be provided for detecting an instantaneous deflection of the spring cylinder. For this purpose, the sensor can have an inductive position sensor or a wire tension sensor. The signals generated by the respective sensor are supplied to a control unit for evaluation. In association with the presumably known spring characteristics of the spring accumulator, the control unit is able to draw a direct conclusion relating to the tensile force acting in the unreeled wire portion based on the deflection status of the spring cylinder which can be derived from the supplied signals.

Irrespective of the particular embodiment of the spring accumulator, the tensile force information obtained via the respective sensor can be used for issuing corresponding prompts in the form of overload warnings or the like. Additionally or alternatively, the information thereof can be used by the control unit to control the electrical drive of the winding drum in such a way that a predetermined average tensile force or wire tension can be maintained in the unreeled wire portion to prevent excessive sagging.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
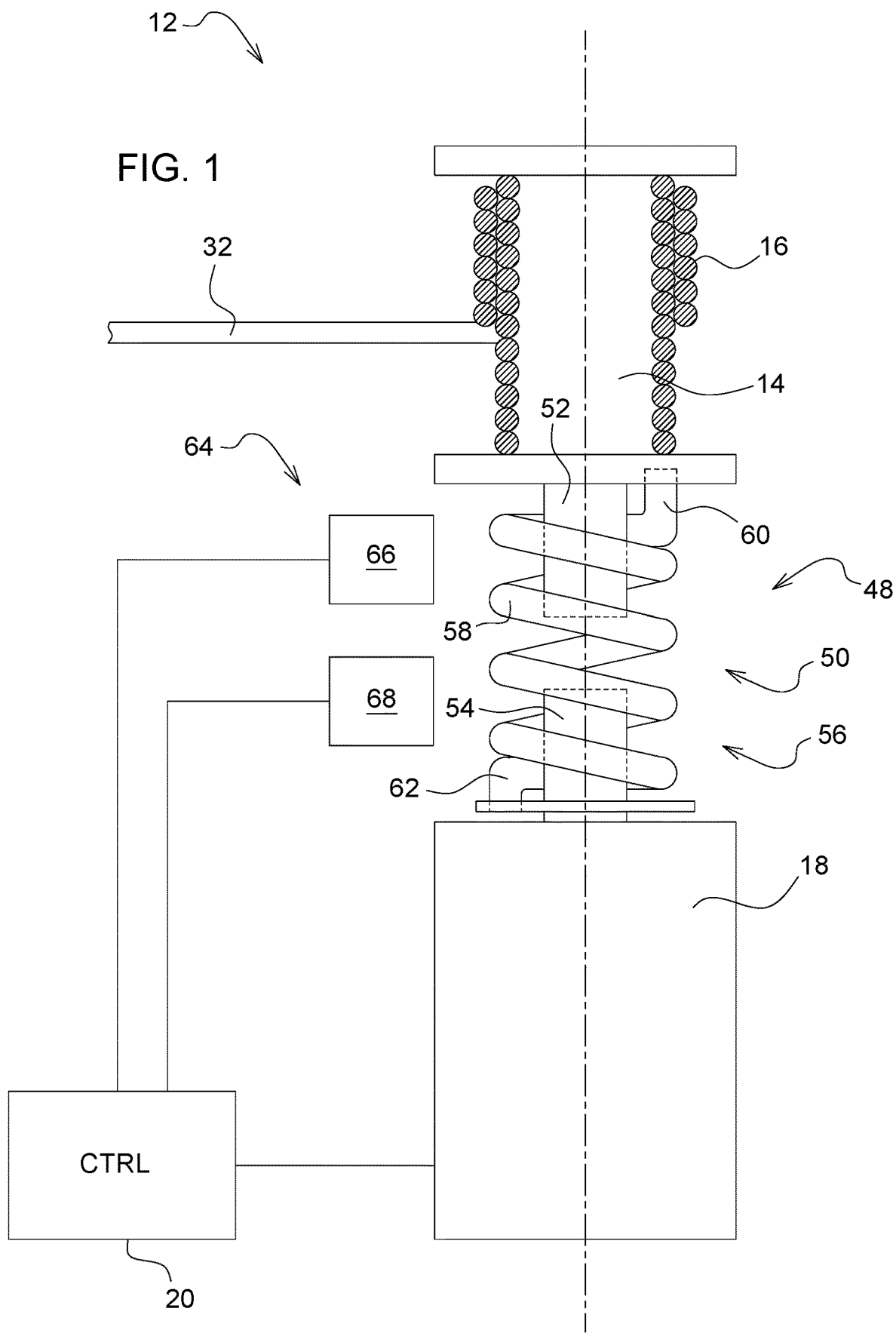
FIG. 1 is a first embodiment of the tensioning device having a spring accumulator formed as a torsion spring.

FIG. 1 shows a first embodiment of a tensioning device according to the present disclosure for a wired energy or data transmission path.

Figure 2:
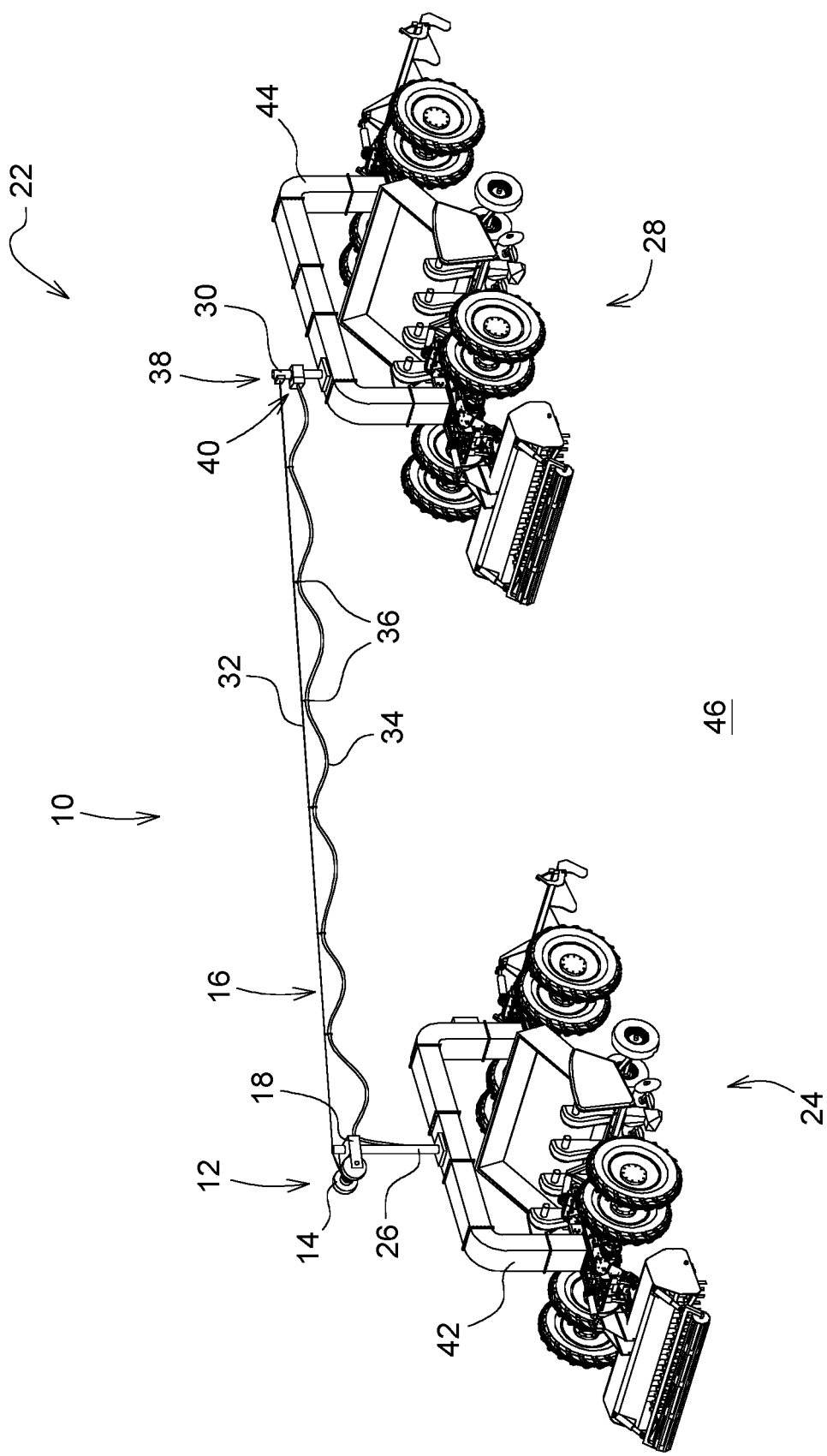
FIG. 2 is a vehicle fleet having an energy or data transmission path which comprises a tensioning device of the type illustrated in FIG. 1.

The tensioning device 12 provided as part of the energy or data transmission path 10 shown in FIG. 2 comprises a cable guide wire 16 stored on a winding drum 14, wherein the winding drum 14 can be set in rotation at the instigation of a control unit 20 by an associated electrical drive 18 for winding and unwinding the cable guide wire 16.

The energy or data transmission path 10 is part of a power supply system of a vehicle fleet 22 illustrated in FIG. 2. Accordingly, a first fleet vehicle 24 is provided with a first base station 26 and a second fleet vehicle 28 is provided with a second base station 30. The cable guide wire 16, more precisely a wire portion 32 unreeled from the winding drum 14, is tensioned between the two base stations 26, 30 in a self-supporting manner, on which cable guide wire a power or data transmission cable 34 is in turn guided in loops, each of a fixed length, by displaceable holding elements 36. In this case, the first base station 26 supports the winding drum 14, while a free end 38 of the unreeled wire portion 32 as well as the power or data transmission cable 34 is releasably connected to the second base station 30 via an associated mechanical or electromechanical coupling device 40. In the present case, the fleet vehicles 24, 28 are electrically operated agricultural harvesters 42, 44. For the sake of clarity, only two harvesters 42, 44 are shown, although there can be any other number of harvesters, which move in a predetermined formation along a field surface 46 to be worked.

As revealed in FIG. 1, the tensioning device 12 furthermore has a spring accumulator 48, by which a resilient tensile force can be exerted on the wire portion 32 unreeled from the winding drum 14. The spring accumulator 48 enables temporary load peaks within the cable guide wire 16 to be reliably absorbed or damped. Possible damage to the cable guide wire 16 and supporting structures associated therewith (in the present case, for example, the two base stations 26, 30) can therefore be prevented. In this case, the spring accumulator 48 itself is formed as a passive spring (damper) unit described below.

The winding drum 14 is set in rotation by the electrical drive 18 via a two-part drive shaft 50 having a first and second shaft portion 52, 54 wherein a torsion spring 56 connecting the two shaft portions 52, 54 is provided as the spring accumulator 48. By selecting the spring characteristics of the torsion spring 56 accordingly, the spring or damping behavior of the spring accumulator 48 can be predetermined as desired.

The torsion spring 56 is formed in the design of a leg spring 58 having a first and second leg 60, 62, wherein the first leg 60 is pivotably associated with the first shaft portion 52 and the second leg 62 is pivotably associated with the second shaft portion 54. In this case, the two mutually flush shaft portions 52, 54 extend within the leg spring 58, which results in a particularly compact design of the spring accumulator 48.

A sensor 64 is present for detecting a relative angle occurring between the two shaft portions 52, 54. The sensor 64 has a first angle encoder 66 associated with the first shaft portion 52 and a second angle encoder 68 associated with the second shaft portion 54. The signals generated by the angle encoders 66, 68 are relayed to the control unit 20 for evaluation. In association with the presumably known spring characteristics of the torsion spring 56, the control unit 20 draws a direct conclusion relating to the tensile force acting in the unreeled wire portion 32 based on the mutual misalignment of the two shaft portions 52, 54 which can be derived from the relayed signals.

Figure 3:
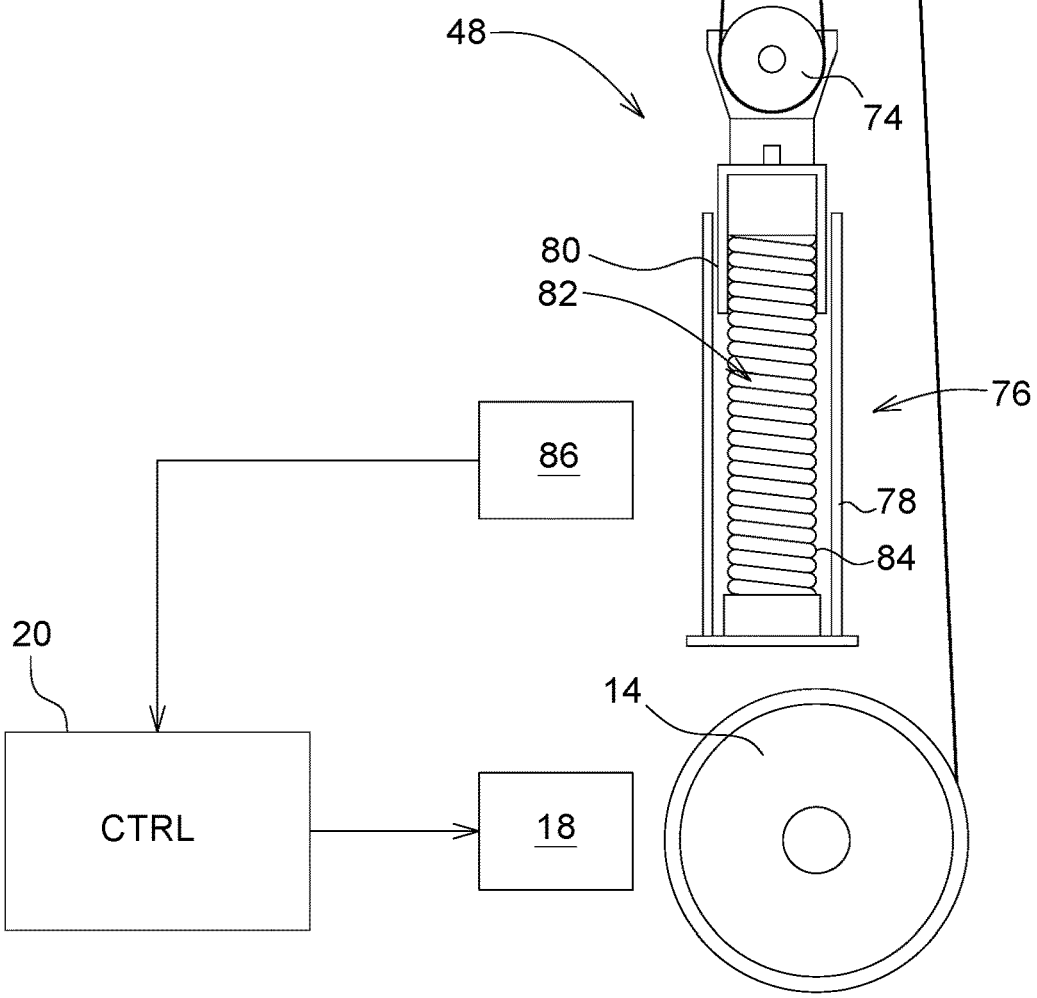
FIG. 3 is a second embodiment of the tensioning device having a mechanical spring cylinder as the spring accumulator.

FIG. 3 shows a second embodiment of the tensioning device according to the present disclosure with a mechanical spring cylinder as the spring accumulator.

Accordingly, the spring accumulator 48 has a guide roller pair 70, 72 and a deflection roller 74 for deflecting the wire portion 32 unreeled from the winding drum 14 along a variable deflection path, wherein a spring cylinder 76 pretensioning the deflection roller 74 in the direction of an increase in the deflection path is provided. The spring cylinder 76 comprises a cylinder housing 78 and a spring piston 80 longitudinally displaceably guided therein, wherein the cylinder housing 78 and spring piston 80 are coupled to one another via a spring element 82. In the present case, the cylinder housing 78 has a predominantly protective function and can, in principle, also be omitted.

By way of example, the spring element 82 for applying the resilient tensile force is a helical spring 84. Depending on the design of the spring cylinder 76, this is a tension or a pressure spring. By selecting the spring characteristics of the helical spring 84 accordingly, the spring or damping behavior of the spring cylinder 76 can be adapted to the respective requirements.

Furthermore, a sensor 86 is provided for detecting an instantaneous deflection of the spring cylinder 76. The sensor 86 has an inductive position sensor or a wire tension sensor. The signals generated by the respective sensor are supplied to the control unit 20 for evaluation. In association with the presumably known spring characteristics of the spring accumulator 48, the control unit 20 draws a conclusion relating to the tensile force acting in the unreeled wire portion 32 based on the deflection status of the spring cylinder 76 which can be derived from the supplied signals.

Figure 4:
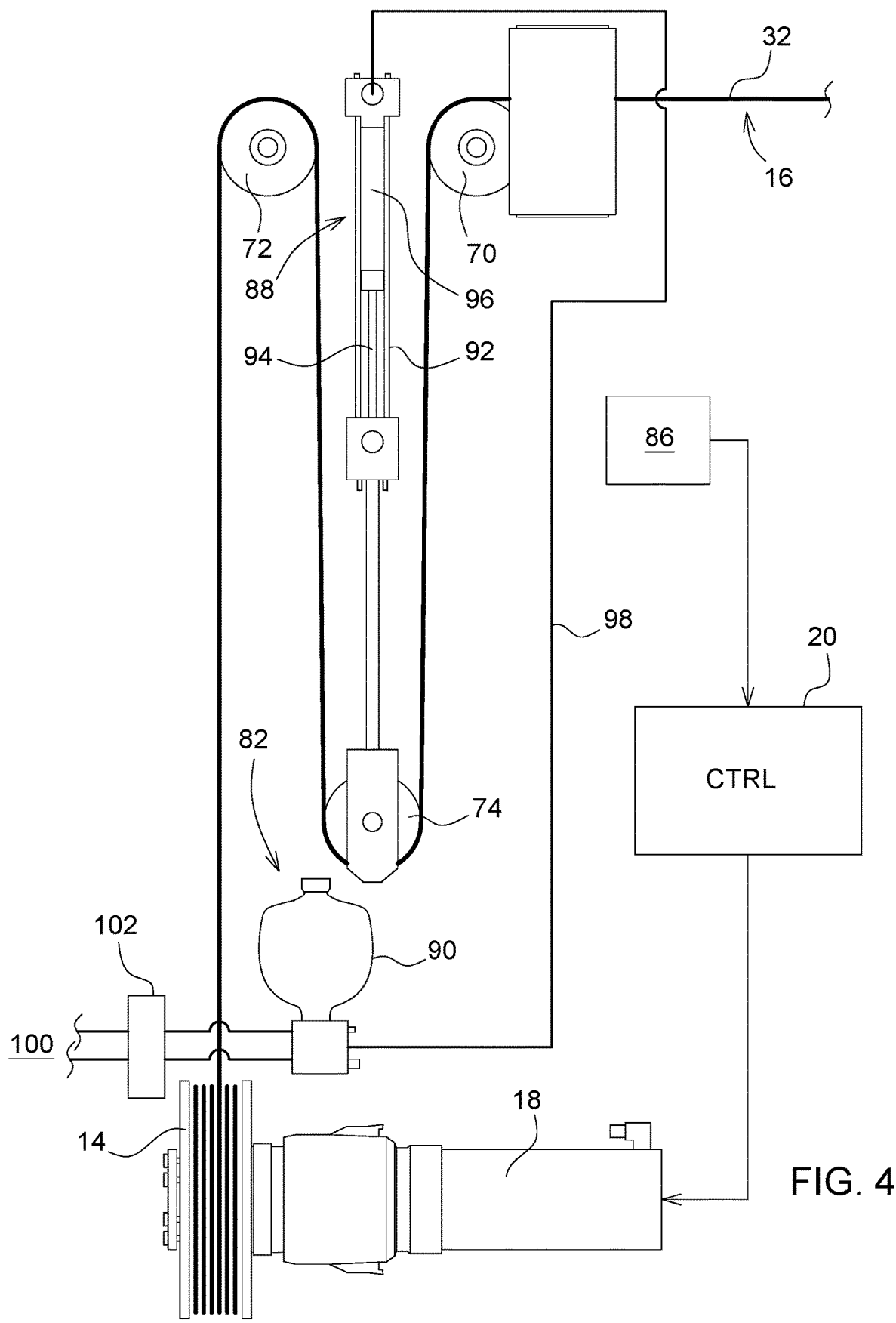
FIG. 4 is a third embodiment of the tensioning device having a hydraulic spring cylinder as the spring accumulator.

FIG. 4 shows a third embodiment of the tensioning device according to the present disclosure. This differs from the second embodiment in that, instead of a mechanical spring cylinder, a hydraulic spring cylinder is provided as the spring accumulator.

Accordingly, the resilient tensile force is applied by a bladder accumulator 90 which communicates with a spring cylinder 88 and whereof the properties determine the spring characteristics of the spring accumulator 48. The spring cylinder 88 is, for example, formed to be single-acting and has a working chamber 96 which is formed within a hydraulic cylinder 92 with a hydraulic piston 94, is loaded on the pressure side by the weight of the cable guide wire 16 and is in communication with the bladder accumulator 90 via a supply line 98.

In order to be able to adjust the spring characteristics of the spring accumulator 48, a hydraulic operating pressure of the bladder accumulator 90 can be modified by a control valve arrangement 102 communicating with a hydraulic system 100. The hydraulic system 100 is part of the first fleet vehicle 24 equipped with the winding drum 14.

Irrespective of the particular embodiment of the spring accumulator 48, the tensile force information obtained via the respective sensor 64, 86 is used for issuing corresponding prompts in the form of overload warnings or the like. Additionally or alternatively, the information therein is used by the control unit 20 to control the electrical drive 18 of the winding drum 14 in such a way that a predetermined average tensile force is maintained in the unreeled wire portion 32 to prevent excessive sagging.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A tensioning device for a wired energy or data transmission path, comprising:
   a winding drum;
   a cable guide wire stored on the winding drum, wherein the winding drum is rotatable by an electrical drive for winding and unwinding the cable guide wire, and wherein the electrical drive operably sets the winding drum in rotation via a two-part drive shaft having a first shaft portion and a second shaft portion;
   a torsion spring connecting the first and second shaft portions;
   a sensor operably detecting a relative angle between the first and second shaft portions; and
   a spring accumulator operably exerting a resilient tensile force on a wire portion unreeled from the winding drum.

2. The tensioning device of claim 1, wherein the torsion spring comprises the spring accumulator.

3. The tensioning device of claim 1, wherein the torsion spring comprises a leg spring having a first leg and a second leg, wherein the first leg is pivotally associated with the first shaft portion and the second leg is pivotally associated with the second shaft portion.

4. The tensioning device of claim 1, wherein the spring accumulator comprises a guide roller pair and a deflection roller for deflecting the wire portion unreeled from the winding drum along a variable deflection path.

5. The tensioning device of claim 4, further comprising a spring cylinder operably pre-tensioning the deflection roller in a direction of an increase in the deflection path.

6. The tensioning device of claim 5, wherein the spring cylinder applies the resilient tensile force via a helical spring.

7. The tensioning device of claim 5, wherein the spring cylinder is hydraulically formed.

8. The tensioning device of claim 7, wherein the resilient tensile force is applied via a bladder accumulator communicating with the spring cylinder.

9. The tensioning device of claim 8, further comprising:
a control valve arrangement; and
a hydraulic system in communication with the control valve arrangement;
wherein, a hydraulic operating pressure of the bladder accumulator is varied via the control valve arrangement.

10. The tensioning device of claim 5, further comprising a sensor for operably detecting an instantaneous deflection of the spring cylinder.

11. The tensioning device of claim 5, further comprising:
a control unit; and
a drive shaft comprising a first shaft portion and a second shaft portion;
wherein, based on the relative angle between the two shaft portions detected by a first sensor or the instantaneous deflection of the spring cylinder detected by a second sensor, the control unit operably controls the electrical drive such that a predetermined average tensile force is maintained in the unreeled wire portion.

12. A tensioning device for a wired energy or data transmission path, comprising:
a winding drum;
a cable guide wire stored on the winding drum, wherein the winding drum is rotatable by an electrical drive for winding and unwinding the cable guide wire;
a spring accumulator operably exerting a resilient tensile force on a wire portion unreeled from the winding drum;
a drive shaft comprising a first shaft portion and a second shaft portion; and
a control unit and a sensor, the sensor being disposed in communication with the control unit;
wherein, based on the relative angle between the two shaft portions detected by the sensor, the control unit operably controls the electrical drive such that a predetermined average tensile force is maintained in the unreeled wire portion.

13. The tensioning device of claim 12, wherein the electrical drive operably sets the winding drum in rotation via the drive shaft.

14. The tensioning device of claim 12, further comprising a torsion spring connecting the two shaft portions.

15. The tensioning device of claim 12, wherein the spring accumulator comprises a guide roller pair and a deflection roller for deflecting the wire portion unreeled from the winding drum along a variable deflection path.

16. A tensioning device for a wired energy or data transmission path, comprising:
a control unit;
a winding drum;
a cable guide wire stored on the winding drum, wherein the winding drum is rotatable by an electrical drive for winding and unwinding the cable guide wire;
a spring accumulator operably exerting a resilient tensile force on a wire portion unreeled from the winding drum;
a drive shaft comprising a first shaft portion and a second shaft portion;
a first sensor and a second sensor being disposed in communication with the control unit;
a control valve arrangement; and
a hydraulic system in communication with the control valve arrangement, wherein a hydraulic operating pressure of the bladder accumulator is varied via the control valve arrangement;
wherein, based on the relative angle between the two shaft portions detected by the first sensor or the instantaneous deflection of the spring cylinder detected by the second sensor, the control unit operably controls the electrical drive such that a predetermined average tensile force is maintained in the unreeled wire portion.

17. The tensioning device of claim 16, further comprising a torsion spring connecting the two shaft portions.

18. A tensioning device for a wired energy or data transmission path, comprising:
a winding drum;
a cable guide wire stored on the winding drum, wherein the winding drum is rotatable by an electrical drive for winding and unwinding the cable guide wire; and
a spring accumulator operably exerting a resilient tensile force on a wire portion unreeled from the winding drum;
wherein the spring accumulator comprises a guide roller pair and a deflection roller for deflecting the wire portion unreeled from the winding drum along a variable deflection path.

* * * * *